J. A. McTAGGART.
TIRE.
APPLICATION FILED AUG. 8, 1916.
1,216,826.
Patented Feb. 20, 1917.
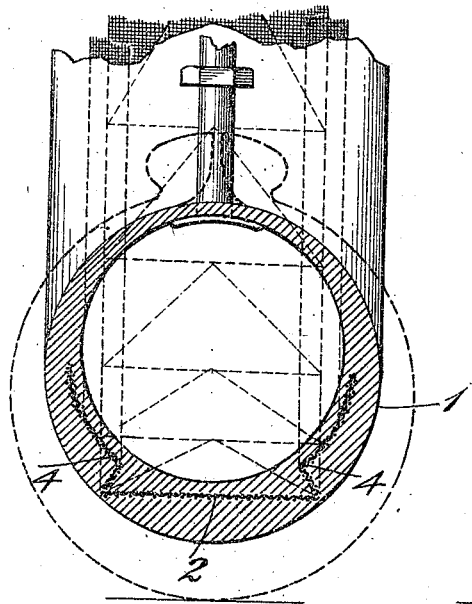
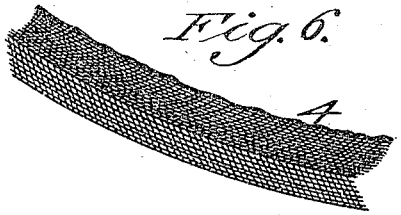
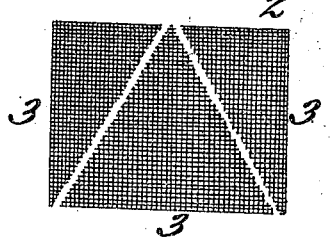
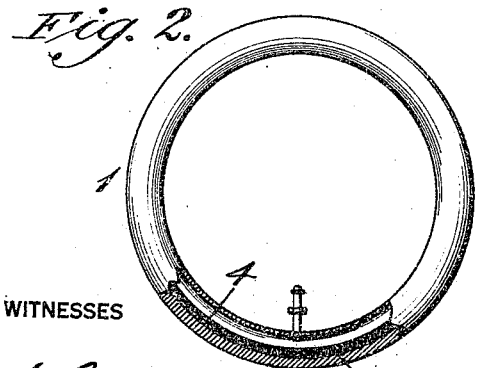
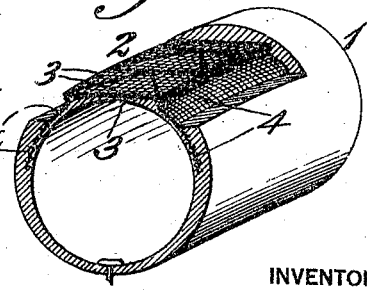
WITNESSES
INVENTOR
John A. McTaggart
BY
ATTORNEYS

UNITED STATES PATENT OFFICE.

JOHN A. McTAGGART, OF PHILADELPHIA, PENNSYLVANIA.

TIRE.

1,216,826.

Specification of Letters Patent. Patented Feb. 20, 1917.

Application filed August 8, 1916. Serial No. 113,698.

*To all whom it may concern:*

Be it known that I, JOHN A. MCTAGGART, a citizen of the United States, residing in the city and county of Philadelphia, State of Pennsylvania, have invented a new and useful Tire, of which the following is a specification.

My invention relates to an improvement in a tire and consists in providing the inner inflatable tube thereof with an armor therein in the circumferential direction of the same adapted to prevent puncture and blow-out of said tube, the same consisting of gauze or mesh-like sections of angular shaped plates which are embedded in the tube, whereby they retain their positions and being independent of each other are freely articulate in the circumferential direction of the tube, without interfering with the resiliency of the tire and not materially increasing the weight thereof.

It consists also in providing said tube at the sides of the same about the tread portion thereof with armor composed of resilient mesh-like sections of plates which are embedded in the tube in the circumferential direction of the same and radially therein so as to retain their position therein without interfering with the resiliency of the tire or materially increasing the weight thereof, while guarding said inflatable tube from puncture and injury at the portions of the shoe especially just above the ground.

The invention is satisfactorily illustrated in the accompanying drawing, but the important instrumentalities thereof may be varied, and so it is to be understood that the invention is not limited to the specific details shown and described.

Figure 1 represents a transverse section of a portion of a tire embodying my invention.

Fig. 2 represents a side elevation of the tire partly cut-away and on a reduced scale.

Fig. 3 represents an end view of Fig. 2 partly broken away.

Fig. 4 represents a perspective view of a portion of the tire partly broken away.

Fig. 5 represents a plan view of the circumferential armor employed.

Fig. 6 represents a perspective view of the side armor employed.

Similar numerals of reference indicate corresponding parts in the figures.

Referring to the drawings—

1 designates the inner inflatable tube of a tire, the same being formed of rubber or other resilient material in any suitable manner.

Embedded in said tube 1 in the tread portion thereof is the armor 2 which is formed of plate-sections 3 of mesh or gauze-like material, steel preferred, and of triangular form separated from each other and placed side by side, and end to end, in the circumferential direction of the tire, so as to form therein a tight and strong armor of comparatively quadrilateral form in the tube curving in the direction of the latter and of flexible nature, said sections freely giving independently of each other circumferentially and laterally with the resiliency of the tube 1 in said directions and having the material of the tube passing through the meshes of the plates so as to clench the latter in position and prevent creeping of the same, while also preserving the resiliency of the tube, and consequently of the tire and presenting an obstacle in the tube to the passage therethrough at the tread thereof of tacks, nails, or any other objects that would pierce the tube, thus rendering the latter puncture and blow-out proof.

In order to guard the tube at what may be termed the sides of the tread portion thereof, there are interposed in the same at said sides, and embedded therein intermediate of the inner and outer peripheries of the tube, the plates 4 of mesh or gauze-like material, steel preferred, bent in comparatively V-shape or angular folds and extending in part transversely of the direction of the tube and in part in the circumferential direction of said tube 1, the terminals of the radial parts approaching the side terminals of the armor plates 2 so as to contact therewith when the wheel is loaded, and thus prevent cutting through the tread portion of the tube.

These plates provide in the tube an armor that is light but strong which guards said tube at the sides of the tread of the same from puncturing, fracturing and injuring objects that may strike said sides above the ground above the tread, it being noticed that the angular shape of said side-guard plates 4 allows them to bend and yield at the angles when the tube contacts with the road, without buckling or interfering with the resiliency of the tube, but on the contrary increasing said resiliency.

Having thus described my invention what I claim as new and desire to secure by Letters Patent, is:—

1. An inflatable tube provided with an internal armor composed of separate sections of mesh or gauze-like material of triangular form placed side by side, and end to end, in the circumferential direction of said tube and embedded in the material thereof.

2. An inflatable tube having therein an armor composed of separate sections of mesh or gauze-like material of triangular form placed side by side and end to end in the circumferential directions of the tube and each yieldable independently of the other and angularly bent reticulated plates embedded in said tube, the terminals of said sections and plates approaching each other and terminating adjacent each other.

JOHN A. McTAGGART.

Witnesses:
   JOHN A. WIEDERSHEIM,
   N. BUSSINGER.